T. KNIGHT.
LOCK.
APPLICATION FILED OCT. 15, 1921.

1,438,652.

Patented Dec. 12, 1922.

WITNESSES

INVENTOR
Thomas Knight,
BY
ATTORNEYS

T. KNIGHT.
LOCK.
APPLICATION FILED OCT. 15, 1921.
1,438,652.
Patented Dec. 12, 1922.
2 SHEETS—SHEET 2.
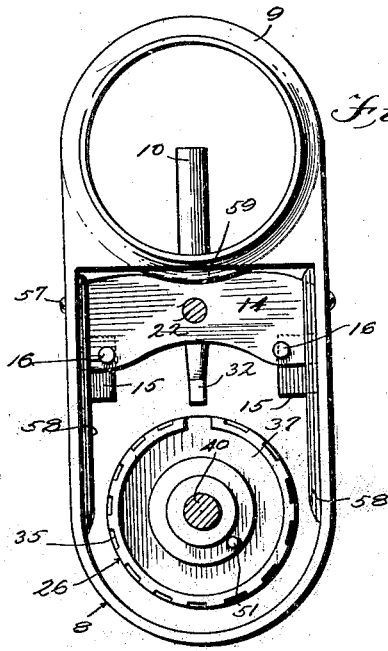
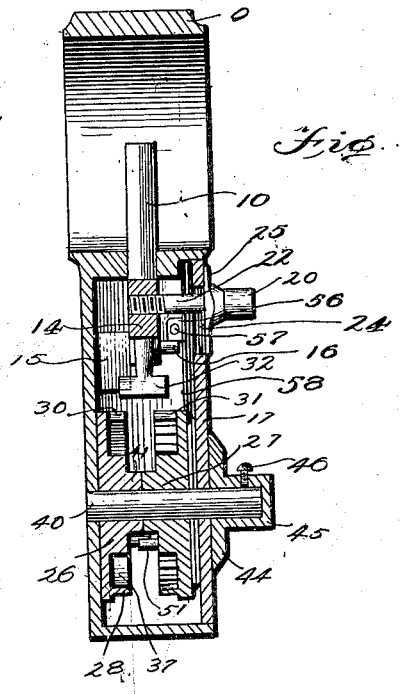
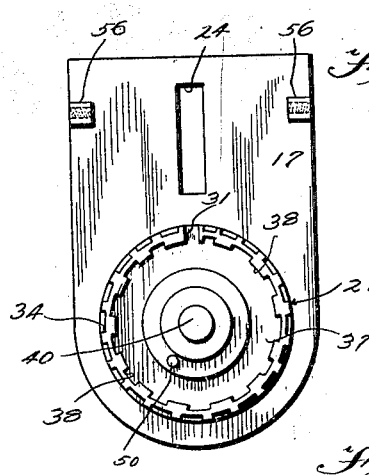
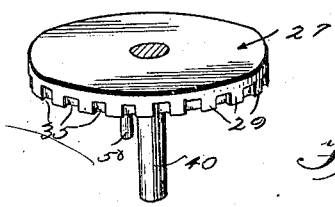
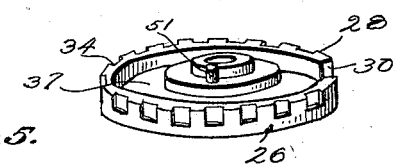
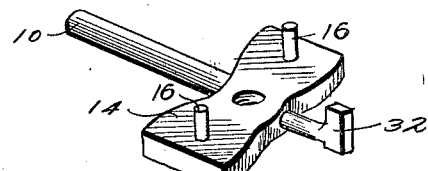
WITNESSES
INVENTOR
Thomas Knight,
BY
ATTORNEYS Patented Dec. 12, 1922.

1,438,652

UNITED STATES PATENT OFFICE.

THOMAS KNIGHT, OF ATLANTA, GEORGIA.

LOCK.

Application filed October 15, 1921. Serial No. 507,928.

*To all whom it may concern:*

Be it known that I, THOMAS KNIGHT, a citizen of the United States, and resident of Atlanta, in the county of Fulton and State of Georgia, have invented certain new and useful Improvements in Locks, of which the following is a specification.

This invention relates to combination locks especially adapted for application to automobiles.

An important object of the invention is to provide an automobile lock which may be readily and conveniently applied to steering posts so that the same will prevent the steering post from being turned by unauthorized persons.

A further object of this invention is to provide a motor vehicle lock which is neat in appearance, which does not interfere with the steering of the vehicle and which may be readily and conveniently operated by one authorized to operate the vehicle.

Other objects and advantages of the invention will be apparent during the course of the following description.

In the accompanying drawings, forming a part of this application and in which like numerals are employed to designate like parts throughout the same, Figure 1 is a plan view of the improved lock applied, the steering post and column for the same being shown in section, and the steering wheel shown in dotted lines.

Figure 2 is a plan view of the improved combination lock with the cover plate removed.

Figure 3 is a vertical transverse sectional view through the improved lock.

Figure 4 is a bottom plan view of a cover plate and one of the tumblers embodied in the invention.

Figure 5 is a perspective of a locking bolt forming a part of the improved lock.

Figure 6 is a group perspective of the tumblers embodied in the invention.

Figure 1:
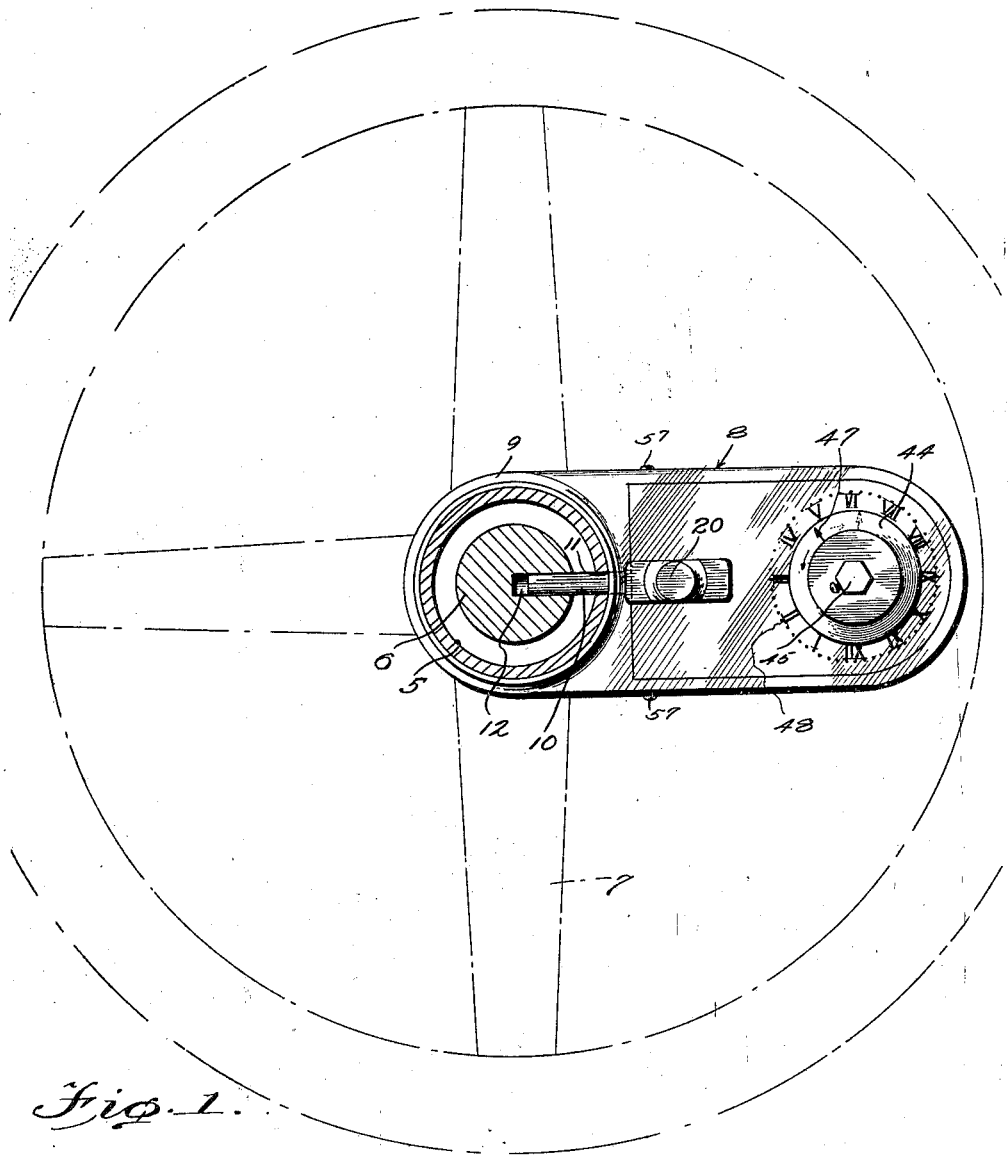
Figure 7:
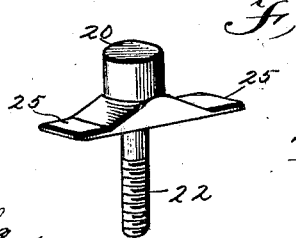
Figure 7 is a perspective of a bolt operating stem or handle.

In the drawing the numeral 5 designates a steering column which rotatably receives a steering post 6 having connection with the usual steering wheel 7. As illustrated in Figure 1, the improved lock which is generally designated by the numeral 8 is provided with an attaching band 9 which receives the steering column 5 and supports the lock at right angles to the longitudinal axis of the column so that the dial and the indicator may be readily viewed by the operator of the vehicle.

The casing of the lock slidably supports a longitudinally movable locking bolt 10 which extends into the band 9 and through a radial opening 11 in the column. The locking bolt 10 is also adapted for extension through a radial socket or recess 12 in the steering post so that when the bolt is advanced as illustrated in Figure 1, the steering post cannot be turned. The rear end portion of the locking bolt is provided with laterally directed oppositely arranged shoulders 14 which are slidable upon a pair of oppositely arranged inwardly directed guide lugs 15 formed within the casing. It is thus seen that the laterally directed shoulders 14 are slidable upon the inwardly directed lugs 15. Also the laterally directed shoulders 14 are provided with upwardly extending pins 16 which contact with the cover plate 17 and thereby hold the shoulders 14 in contact with the lugs 15. It is thus seen that the oppositely directed shoulder 14 and the upwardly directed pins 16 constitute means for holding the bolt 10 in position.

As illustrated in Figure 2 the ends of the shoulders 14 flatly contact with the sides of the casing and thereby hold the bolt 10 against lateral movement. When released the locking bolt 10 may be manually moved by means of a bolt operating knob 20 having a stem 22 threaded into the meeting portions of the shoulders 14. As illustrated in Figure 3 the bolt operating stem 22 is slidable through a longitudinal slot 24 in the cover plate 17 and the flanges 25 formed at the forward end of the knob 20 serve as a means for concealing the longitudinal slot.

The movement of the longitudinally movable locking bolt 10 is controlled by superposed disk-shaped tumblers 26 and 27 arranged within the casing and having inwardly directed flanges 28 and 29 respectively, the said flanges having radial slots 30 and 31 respectively for the reception of the head 32 of the locking bolt. When the disk-shaped tumblers 26 and 27 are properly positioned the radial slots 30 and 31 in the flanges 28 and 29 will be in registration so as to receive or permit of the passage of the head 32 of the locking bolt. However, when the slots 30 and 31 are not in registration the head 32 will engage the inwardly directed flanges 28 and 29 and the rearward movement of the bolt will be prevented. Should an attempt be made to pick the lock by manipulating the tumblers the head 32 will be received within a plurality of notches or recesses 34 and 35 in the flanges 28 and 29 respectively.

By reason of the notches 34 and 35 the picking of the lock is prevented. A person endeavoring to pick the lock will be deceived as to the location of the slots 30 and 31 when the head 32 is extended into the notches 34 and 35.

When the slots 30 and 31 are in registration the head 32 will be moved rearwardly into a pair of opposed annular grooves 37 in the opposed sides of the tumblers 26 and 27 and the tumblers may then be rotated so that the slots 30 and 31 may be moved out of registration with each other. When the head 32 is arranged in the annular groove 37 the bolt 10 may be locked in its retracted position by moving the slots out of registration with each other. Should an attempt be made to pick the lock or to advance the bolt 10 when the same is retracted the head 32 will encounter a plurality of safety notches 38 on the inner side of the flange 29 and the person endeavoring to pick the lock or to advance the bolt 10 will be unable to ascertain the location of the slots 30 and 31.

The tumbler 27 has rigid connection with a spindle 40 and the spindle 40 rotatably extends through the tumbler 26. The inwardly directed hubs 41 of the disk-shaped tumblers serve as a means for spacing the tumblers so as to permit of the movement of the head 32. An indicator 44 in the form of a disk is provided with a manipulating knob 45 rigidly secured to the spindle by means of a set screw 46 or the like and the said indicator is provided with a pointer 47 or other indicating means to cooperate with a dial 48 in indicating the position of the slot 31 in the inwardly directed flange 29.

As illustrated in Figure 6 the hub of the tumbler 27 is provided with a pin 50 arranged in spaced parallel relation to the spindle 40 and in the path of travel of a second pin 51 carried by the disk shaped tumbler 26. When the disk-shaped tumbler 27 is rotated, the pin 50 will be moved in an annular path and engaged with the pin 51 for rotating the tumbler 26. When the tumbler 26 is thus rotated the flange 28 will also be rotated for properly positioning the slots 30 and 31.

The tumbler 27 is now moved in the opposite direction by the operating knob 45 so that the slot 31 in the flange 29 will be arranged in registration with the slot 30.

With the tumblers thus positioned the bolt 10 may be retracted and the steering post will be released so that the operator may turn the steering wheel. However, as previously stated when the head 32 is arranged in an annular groove 37 the tumblers may be rotated to lock the bolts in a retracted position.

Cover plate 17 is provided with a pair of inwardly directed attaching lugs 56 adapted to be received by retaining screws 57 threaded through the side of the casing whereby to hold the cover plate in position. The cover plate is limited in its inward movement by contact with a pair of ribs 58 and by contact with a shoulder 59 formed at the forward end of the casing.

Having thus described my invention, what is claimed is:—

1. A steering post lock for motor vehicles comprising a casing having an attaching band adapted to receive the steering column of a motor vehicle, a bolt slidable longitudinally of said casing and adapted to engage the steering post of the vehicle, said bolt being provided at its rear end with a head, said bolt also being provided forwardly of said head with oppositely directed shoulders, guide lugs carried by said casing and slidably supporting said shoulders, tumblers having inwardly directed flanges provided with notches, certain of said notches being extended entirely through the flanges defining slots adapted to slidably receive the head, the opposed sides of said tumblers being provided with annular grooves freely receiving said head, pins carried by the opposed sides of said tumblers, a stem extending through said tumblers, and an indicating disk having an operating knob secured to said spindle, said casing being provided with an indicating dial cooperating with said indicating disk.

2. A steering post lock for motor vehicles comprising a casing having an attaching band adapted to receive the steering column of a motor vehicle, a bolt slidable longitudinally of said casing and adapted to engage the steering post of the vehicle, said bolt being provided at its rear end with a head, said bolt also being provided forwardly of said head with oppositely directed shoulders, guide lugs carried by said casing and slidably supporting said shoulders, tumblers having inwardly directed flanges provided with notches, certain of said notches being extended entirely through the flanges defining slots adapted to slidably receive the head, the opposed sides of said tumblers being provided with annular grooves freely receiving said head, pins carried by the opposed sides of said tumblers, a stem extending through said tumblers, an indicating disk having an operating knob secured to said spindle, said casing being provided with an indicating dial cooperating with said indicating disk, and an operating member connected to said bolt and extended exteriorly of said casing.

3. A lock comprising a pair of coacting tumblers having flanges provided with slots, a bolt having a head slidable through said slots, the opposed sides of said tumblers being provided with continuous grooves to receive the head of said bolt, a casing receiving said bolt and tumblers and having means guiding the bolt, and coacting pins carried by the opposed sides of said tumblers.

4. A lock comprising a pair of coacting tumblers having flanges provided with slots, a bolt having a head slidable through said slots, the opposed sides of said tumblers being provided with continuous grooves to receive the head of said bolt, a casing receiving said bolt and tumblers and having means guiding the bolt, coacting pins carried by the opposed sides of said tumblers, and an indicating dial arranged exteriorly of the casing and having a spindle supporting said tumblers.

THOMAS KNIGHT.